United States Patent Office 2,701,206
Patented Feb. 1, 1955

2,701,206

CORROSION INHIBITING COMPOSITION

Harry E. Fales, Wilmington, N. C.

No Drawing. Application February 12, 1952,
Serial No. 271,277

2 Claims. (Cl. 106—14)

This invention relates to compositions for inhibiting corrosion of metals such as iron, steel, copper and brass, and for cleaning corrosion from such metals and inhibiting further corrosion.

The primary purpose of the invention is to provide a corrosion inhibitor which is not subject to deterioration in storage and which when applied to a metal will prevent the corrosion thereof for long periods of time.

A further purpose of the invention is to provide a corrosion inhibitor having sufficient fluidity so that an effective corrosion inhibiting film may be applied to normally inaccessible portions of a metal article by immersing it in the corrosion inhibiting composition.

A further purpose of the invention is to provide a corrosive inhibitor which is particularly effective in preventing rust or deterioration of a gun barrel in which there has been used a shell having a corrosive detonator or primer such as mercury fulminate.

The corrosion inhibiting composition formulated according to this invention comprises approximately, by weight, 7.0% mineral oil, 78% of a lower alkyl alcohol, 12% of a lower alkyl salicylate, .5% potassium iodide, .6% of an oleic acid soap, .5% camphor, .7% iodine crystals, and .7% of 28% ammonia water. It has been found that each of the foregoing ingredients are necessary to obtain a rust inhibiting composition which has the desired characteristics of preventing a formation of rust on metal or metallic objects for long periods of time. For example, omission of the ammonia water has the effect of preventing the composition from drying reasonably quickly, and it also appears that the ammonia water aids in producing a homogeneous solution. The desired results can be obtained consistently only when the ammonia water is added to the composition after the remaining ingredients have been mixed together. It has also been found necessary to permit the completed mixture to stand from about 8 to 10 hours in order to fully develop its rust resisting characteristics. The rust resisting characteristics of the composition may be enhanced by adding to the composition at the time of the addition of the ammonia water about 0.6% by weight of the total composition of a liquid "Japan drier."

Various ones of the foregoing compounds which make up the subject corrosion inhibiting compound have been previously employed in compositions of this kind, but in each instance the effectiveness of the composition has been limited to the extent that the compositions have not been useful commercially. It has been found that a corrosion inhibiting composition employing the specific combination of compounds above mentioned, in approximately the quantities indicated, has rust resisting properties which are greatly superior to the additive effect of the several individual compounds. The following examples illustrate the manner in which a composition of this kind may be formulated and employed, as well as its effectiveness in preventing the corrosion of metallic objects which normally occurs as a result of the slow oxidation of their surfaces.

Example I 300 cc. of a mineral oil was placed in a mixing container and to this 5,000 cc. of iso-propyl alcohol was added. This mixture was stirred until it became homogeneous. 500 cc. of methyl salicylate was then added and the solution was further agitated. A separate solution consisting of 30 grams of castile soap and 23 grams of camphor in 175 grams of ethyl alcohol was prepared and thereafter added to the solution in the mixing container with agitation. A further separate solution comprising 25 grams of potassium iodide and 35 grams of iodine crystals in 380 grams of ethyl alcohol was prepared and added to the solution in the mixing container. The solution was again stirred until it appeared homogeneous. 32 cc. of 28% ammonia water was then added with agitation and the solution was retained in the mixing container without further agitation for a period of about ten hours. At the end of this time the solution had become almost colorless.

Two pieces of ferrous metal having the same composition, and having a slight rust coating, were cleaned of loose rust with steel wool. One piece of the ferrous metal thus cleaned was immersed in the corrosion inhibiting composition for several minutes. The ferrous metal was then removed from the composition and the free running composition was allowed to drain off. Thereafter, the film of composition adhering to the metal was exposed to a slightly elevated temperature for several hours in order to quicken the drying of the film. Thereafter the treated and the untreated pieces of ferrous metal were hung up side-by-side out-of-doors where they were exposed to all weather conditions for over one year. At the end of the test period the ferrous metal which had been treated with the corrosion inhibiting composition was in excellent condition, no appreciable rust scale having formed, whereas the non-treated ferrous metal was covered with a heavy scale of rust and was badly pitted.

Similar tests were conducted of shorter periods of time, and in each case, ferrous metal which had been treated with the composition formulated as described above was completely free of rust while the test metals which had not been treated were, in each instance, corroded and scored.

Example II

A U. S. rifle caliber 30 M–1, was fired several times using the shells having a mercury fulminate primer. After firing, the rifles were left outdoors on the ground for about two days. The barrels were subsequently inspected and it was found that rust had accumulated on both the lands and grooves of the barrel, and that a small amount of the pitting had also occurred. A second set of caliber 30 M–1 rifles were treated by immersing the barrels in a corrosion resisting solution made up according to Example I. After a short period the barrels were removed from the solution and the excess solution permitted to drain from the barrels. After the solution had thoroughly dried within the barrels the rifles were fired using shells having mercury fulminate primers. The rifles were permitted to remain outdoors under the same conditions as the rifles which had not been treated with the corrosion resisting solution. After about two days the rifles were inspected and it was found that the barrels were clear of any rust formation or pitting.

It will be apparent that the composition described above may be formulated equally well by employing lower alkyl alcohols, other than ethyl alcohol, to solubilize the soap, camphor, and iodide which are added to the composition. Soaps of fatty acids other than oleic acid may also be employed. It will be further understood that it does not appear that the order in which the various compounds are added together has a critical bearing on the ultimate effectiveness of the composition as a corrosion inhibitor, except that the ammonia water should be added after all other ingredients have been mixed together in the manner prescribed above.

Having thus described my invention, what I claim as new and desired to be secured by Letters Patent are:

1. A corrosion inhibiting composition comprising approximately, by weight, 78% of a lower alkyl alcohol, 12% of a lower alkyl salicylate, 7.0% of mineral oil, .6% of an oleic acid soap, .5% camphor, .5% potassium iodide, .7% iodine crystals, and .7% of 28% ammonia water.

2. A corrosion inhibiting composition comprising approximately, by weight, 78% iso-propyl alcohol, 7.0% mineral oil, 12% methyl salicylate, .6% oleic acid soap, .5% camphor, .5% potassium iodide, .7% iodine crystals, and .7% of 28% ammonia water.

References Cited in the file of this patent

UNITED STATES PATENTS

| | | |
|---|---|---|
| 307,451 | Folger | Nov. 4, 1884 |
| 919,884 | Klever | Apr. 27, 1909 |
| 2,311,505 | Archibald et al. | Feb. 16, 1943 |
| 2,325,304 | Bushrod | July 27, 1943 |
| 2,562,162 | Gray | July 31, 1951 |
| 2,580,036 | Matuszak et al. | Dec. 25, 1951 |